March 8, 1955  O. W. GREENE ET AL  2,703,438
APPARATUS FOR BLENDING FIBERS
Filed April 27, 1949  9 Sheets-Sheet 1

Fig-1
Fig-1-A

OREN W. GREENE,
ROBERT W. TWITTY, &
THERMAN L. RICHIE,
INVENTORS.

BY

ATTORNEY.

March 8, 1955  O. W. GREENE ET AL  2,703,438
APPARATUS FOR BLENDING FIBERS

Filed April 27, 1949  9 Sheets-Sheet 5

INVENTORS:
OREN W. GREENE,
ROBERT W. TWITTY, &
THERMAN L. RICHIE.

BY
ATTORNEY

March 8, 1955 O. W. GREENE ET AL 2,703,438
APPARATUS FOR BLENDING FIBERS
Filed April 27, 1949 9 Sheets-Sheet 6

OREN W. GREENE,
ROBERT W. TWITTY, &
THERMAN L. RICHIE,
INVENTORS.

BY
ATTORNEY.

March 8, 1955  O. W. GREENE ET AL  2,703,438
APPARATUS FOR BLENDING FIBERS
Filed April 27, 1949  9 Sheets-Sheet 8

OREN W. GREENE,
ROBERT W. TWITTY, &
THERMAN L. RICHIE,
INVENTORS.

BY

ATTORNEY.

United States Patent Office 2,703,438
Patented Mar. 8, 1955

2,703,438

APPARATUS FOR BLENDING FIBERS

Oren W. Greene, Robert Woods Twitty, and Therman L. Richie, Marion, N. C., assignors to Textile Equipment Corporation, Greenville, S. C., a corporation of South Carolina Application April 27, 1949, Serial No. 89,942

2 Claims. (Cl. 19—69)

This invention relates to a method and apparatus for the blending of fibres and more especially to the combination with a plurality of fibre preparation machines, which are adapted to deliver quantities of fibres onto a common conveyor, of means for automatically delivering batches of fibres from each of the fibre preparation machines on top of each other or in superposed relation to each other in the form of a sandwich at which time all of the fibres processed by the various fibre preparation machines are fed, simultaneously, into a suitable machine for mixing and blending the various fibres thus delivered.

It is an object of this invention to provide apparatus for processing fibres, such as a plurality of feeders having means for catching the fibres processed by each of the feeders and holding the fibres and stopping any one of the feeders independently of the others when a predetermined poundage of fibres have been processed by a particular feeder, as a result of which all of the feeders will process a predetermined poundage of fibres independently of each other and will hold the fibres thus prepared until all of the feeders have stopped automatically, all of which is clearly shown and described in our U. S. Patent No. 2,412,506 of December 10, 1946. Means are connected to each of the feeders to render the means for catching the fibres operable to dump the fibres held by all of the feeders onto a suitable conveyor to convey them into a hopper having a hinged bottom which is adapted to normally remain in closed position until a batch of fibres from each of the feeders has been conveyed into the hopper in superposed relation to each other. The hinged bottom is then automatically released to allow the batches to fall, by gravity, into a cleaner, blending machine, or any suitable machine which agitates the fibres in loose form to thoroughly mix them into a common lot of fibres.

It is another object of this invention to provide a hopper of the type described which is adapted to receive a plurality of batches of fibres in superposed relation to each other, the hopper having a hinged bottom, and to provide locking means for holding the hinged bottom in closed or horizontal position until all of the batches have been dumped into the hopper, and to provide means automatically operable upon a predetermined number of batches of processed fibres being dumped into the hopper to release the hinged bottom of the hopper for dumping all of the fibres, simultaneously, into a suitable blending machine or the like.

It is another object of this invention to provide a plurality of fibre preparation machines adapted to deliver certain weight of fibres onto a common conveyor, with means for automatically stopping each machine when a predetermined poundage of fibres has been processed and holding the fibres ready for delivery to the conveyor and continuing operation of the other machines until each of the machines has processed a predetermined weight of fibres, at which time the fibres processed by the first of the preparation machines are dumped onto the conveyor. There is also provided an automatic switch closing means on the conveyor which will be energized as the fibres from the first machine pass adjacent the second of the machines to thus cause the fibres processed by the second of the machines to be dumped onto the fibres from the first of the machines, and so on, until the fibres from all of the machines have been dumped onto each other in the form of a sandwich. The conveyor carries then the sandwich of fibres into a suitable blending machine or the like for mixing the same and to thereby blend the fibres into a common lot of fibres.

Some of the objects of the invention having been stated, other objects will appear as the description proceeds when taken in connection with the accompanying drawings, in which—

Figure 1–A is an extension of Figure 1 showing a portion of the conveyor and showing the improved hopper for delivering the processed fibers to a suitable blending machine or the like;

Referring more specifically to the drawings, the reference characters A, B and C represent a plurality of fiber preparation machines, such as what are commonly known as feeders, and which disintegrate the fibers after they have passed through the bale-breakers and the like. The fibers are then passed to a blending machine or cleaner or other fiber preparation machines, to be delivered to the pickers in the picking room. These feeders are identical to each other and a brief description of one will be sufficient for the others.

Each of the feeders has an electric motor 10 for driving the same, each feeder having a plurality of pulleys 11, 11a, 12, 12a, and 13 which are connected together by belts 14, 15 and 16 which drive conventional fiber handling mechanism, not shown, disposed within the feeder housing and also drive conventional elevating mechanism, not shown, for elevating the disintegrated fibers and dropping them down through a discharge opening 17 of the feeder to suitable conveying apparatus.

To facilitate operation of the present invention, it is necessary that the fibers be prevented from falling directly onto a suitable conveying apparatus. A structure such as that shown in our Patent Number 2,412,506, of December 10, 1946, is employed to hold and weigh the fibers as they drop through the discharge opening 17 of the feeder, so a predetermined weight of fibers can be collected into a suitable fiber receiving container and held there, and when a predetermined weight has been received, the feeder will automatically be stopped and the other feeders will continue operation until all of the fiber receiving containers disposed below the discharge openings of the feeders shall have received a predetermined weight, at which time the bottoms of the fibers receiving containers will be opened to discharge all of the contents of all of the fiber receiving containers into a suitable conveying mechanism to convey the fibers to the improved hopper to be later described.

In the modified form of the invention, to be later described, the feeder, which may be any one of the feeders A, B and C will automatically be stopped when a predetermined weight has been received in the fiber receiving container and the other feeders will continue operation until all of the fiber receiving containers disposed below the discharge openings of the feeders have been filled in the manner heretofore described. However, when all of the feeders have been filled, the bottom of the fiber receiving container on feeder A will be opened to discharge its contents onto the conveyor mechanism and as the contents of the container from the first feeder A pass beneath the fiber receiving container of the second feeder B the contents from the container on feeder B will be discharged onto the contents from feeder A and then as the contents from feeders A and B pass beneath the container for the feeder C, the contents from this last fiber receiving container will be discharged onto the contents from the feeders A and B, as a result of which the contents from the feeders A, B and C will be delivered to a succeeding processing machine, such as a blender or the like with the batches from each of the machines A, B and C being disposed in superposed relation to each other or in sandwich form in a state similar to that in which the hopper to be later described delivers the fibers to the blender or the like.

Rigidly secured to the ends of the outer side walls of the discharge portion of each feeder are legs 20 and 21 of a U-shaped member 22, these being riveted to a suitable bar 23 which is, in turn riveted to the side walls of the feeder. This U-shaped member 22 has outwardly projecting stops 24 and 25 (Figures 1, 2, 4 and 5) secured thereto for purposes to be later described. Downwardly and outwardly projecting members 26 and 27 are secured to the legs 20 and 21 of the U-shaped member 22 and have pivotally secured thereto, as at 28 and 29, legs 32 and 33, respectively, of a second U-shaped member 30 which is disposed at a slightly lower elevation than the U-shaped member 22 in Figure 4.

Figures 6, 11, 12:
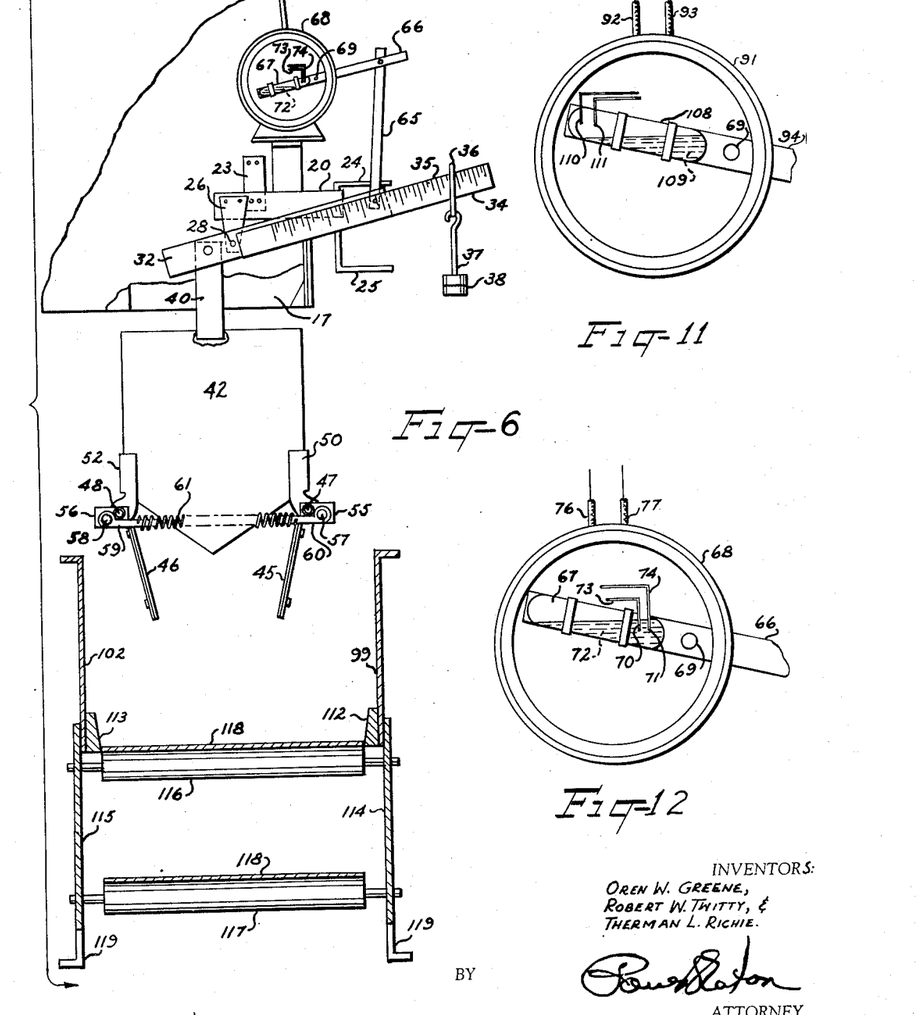
Figure 6 is an enlarged view similar to the right-hand portion of Figure 4, but showing the fiber receiving container in lowered and opened position, and showing other cooperating parts in a different position.
Figure 11 is an enlarged elevation of the right-hand central portion of Figure 2 and showing a type of mercury switch employed in the solenoid circuit for controlling the electric motors which drive the feeders.
Figure 12 is an enlarged elevation of the right-hand central portion of Figure 4 and showing the mercury switch for energizing the solenoid which controls the opening of the bottom doors of the fibre receiving container.
Figures 7, 8, 9, 10:
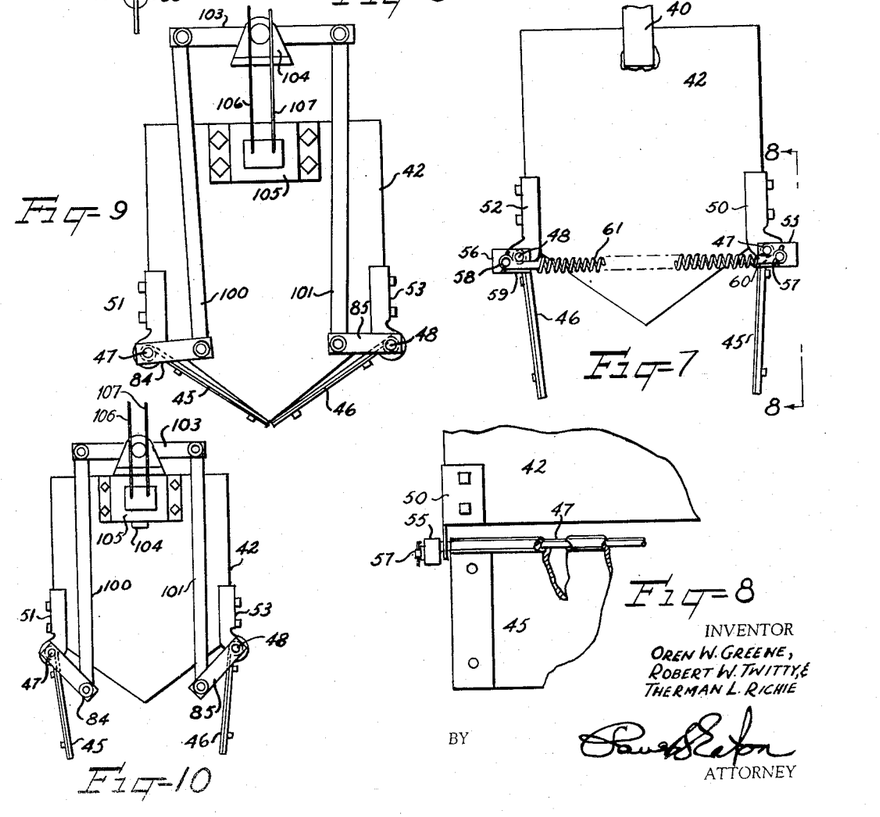
Figure 7 is an enlarged view of the fiber receiving container shown in Figure 6 and also looking along the line 7—7 in Figure 2.
Figure 8 is a detailed view of the lower portion of Figure 7 and looking along the line 8—8 in Figure 7.
Figure 9 is a view showing the opposite end of the container from that shown in Figure 7 and is an enlarged elevation taken along the line 9—9 in Figure 2 and showing a solenoid and the linkage connected thereto for controlling the opening and closing of the bottom doors or closures of the fibre receiving container.
Figure 10 is a view similar to Figure 9, on a reduced scale, and showing the solenoid energized to open the bottom doors of the fibre receiving container.
Figures 13, 14:
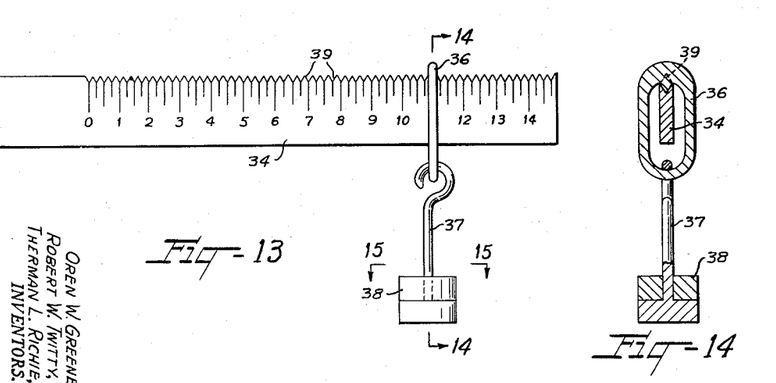
Figure 13 is an enlarged detail of the graduated end of the weight lever shown in the upper right-hand portion of Figure 6.
Figure 14 is a vertical sectional view taken along the line 14—14 in Figure 13.

Fixedly secured to the legs 31 is a weight lever 34 (Figures 4 and 6) which is graduated in pounds and ounces as at 35 (Figure 13) and is adapted to receive a ring member 36 having a knife edge adapted to fit into the notches 39 in the upper edge of the weight lever 34 (Figures 4, 6, 12 and 14). The member 36 has a hooked weight member 37 adapted to be hooked in the ring 36 and one or more weights 38 may be placed thereon to cause it to hold a proper amount of weight within the fiber container to be presently described. The stops 24 and 25, as previously described, are engaged by the member 30 in its up and down movement to limit swinging movement of the member 30 (Figure 6).

Figure 15:
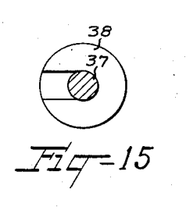
Figure 15 is a sectional plan view taken along the line 15—15 in Figure 13.

Pivotally secured to the leg portions 32 and 33 of the U-shaped member 30 are depending links 40 and 41, respectively, which have their lower ends rigidly secured to a fiber receiving container 42 (Figures 2, 5, 6 and 7). This container 42 is over-balanced on the pivot 23 by the addition of suitable weights to the hooked member 37 (Figures 13 and 14 and 15) so that it will take a predetermined number of pounds and ounces of fibers in the container 42 to swing the U-shaped member 30 on its pivot against the weight applied to the member 37.

The upper end of the container 42 is open and is adapted to receive fibers falling from the feeder discharge opening 17. The lower end of the container 42 is closed by a pair of swinging doors or closure members 45 and 46 whose upper ends are curled around and fixed to rods 47 and 48, respectively, which are pivotally mounted in brackets 50 and 51 and 52 and 53 respectively (Figures 6 to 10 inclusive).

Referring to Figures 4, 6, 7 and 8, it may be observed that there is disposed at the end of the container 42 which has the weight lever 34 associated therewith, short arms 55 and 56 which are connected to the ends of the rods 47 and 48, respectively, and in which pins 57 and 58 are mounted. To these pins 57 and 58 are pivotally connected short links 59 and 60 to the proximate ends of which the ends of a tension spring 61 are connected.

The spring 61 normally has a tendency to pull the bottom closures 45 and 46 to closed position at all times, and the tension in this spring 61 is sufficient to hold the bottom closures 45 and 46 in closed position, although the container 42 may be completely filled with fibers from the feeder. The spring 61 also holds a solenoid plunger, to be later described, in a raised position and when the solenoid is energized, it will overcome the tension spring 61 and will open the closures 45 and 46 as observed in Figures 6, 7 and 10.

Pivoted to the U-shaped member 30 is the lower end of a link 65 (Figures 4 and 6) which is pivoted at its upper end to an arm 66 on which is mounted a conventional mercury switch bulb 67 for controlling the electric motor 10 as will be later described. The bulb 67 is disposed within a conventional housing 68. The arm 66 is pivotally connected as at 69 to the conventional housing 68. The bulb 67 has a pair of contacts 70 and 71 (Figure 12) disposed on the interior of the bulb and adapted to be surrounded by a quantity of mercury 72 when the lever 66 is in the position shown in Figure 12. Wires 73 and 74 are connected to the contacts 70 and 71, respectively, and lead to a conventional junction box 75 (Figure 2) and from this box wires 76 and 77 extend.

Figure 4:
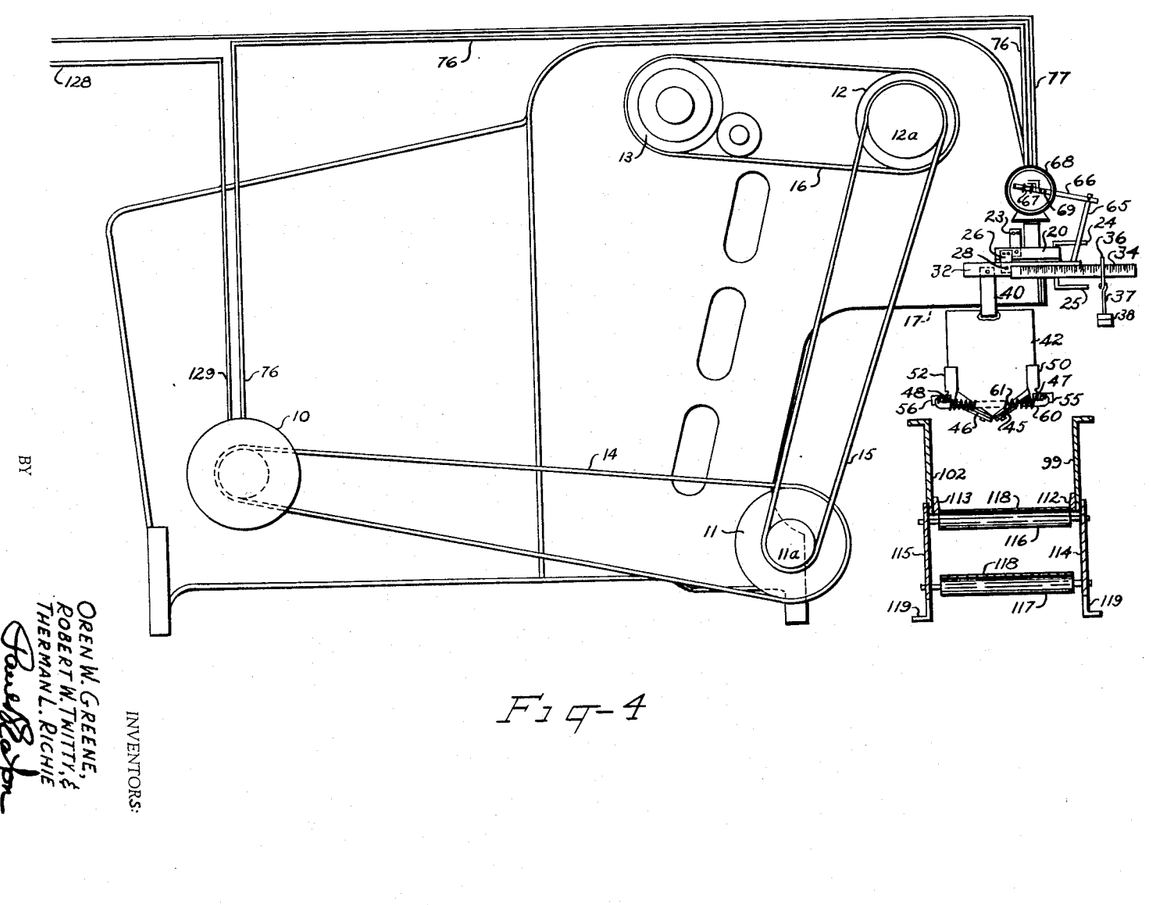
Figure 4 is an elevation of the feeder looking at the left-hand end of Figure 1, and showing the conveyor in vertical section and taken substantially along the line 4—4 in Figure 1.
Figure 5:
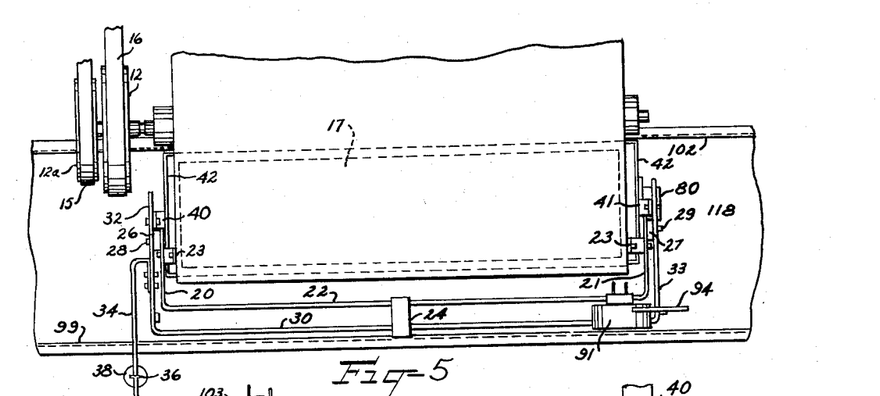
Figure 5 is a top plan view showing a portion of one of the feeders as it extends above the conveyor and showing the special apparatus connected thereto which is adapted to cooperate with the present invention.

When the container 42 receives a predetermined amount of poundage of fibers, it will be moved downwardly from the position shown in Figure 4 to the position shown in Figure 6 and will thus break the circuit to the electric motor 10, due to the fact that the right-hand end of the arm 66 will be moved upwardly as shown in Figure 6, thus causing the mercury to move out of contact with the contacts 70 and 71 in the bulb 67. The motor circuit will be later described.

On the end of the container 42 opposite from the end which has just been described, there is disposed a pair of arms 84 and 85 which are fixedly secured on the other ends of the rods 47 and 48 previously described. The arms 84 and 85 have vertically disposed links 100 and 101, respectively, pivotally connected thereto which, at their upper ends, are connected to a cross bar 103.

Figure 2:
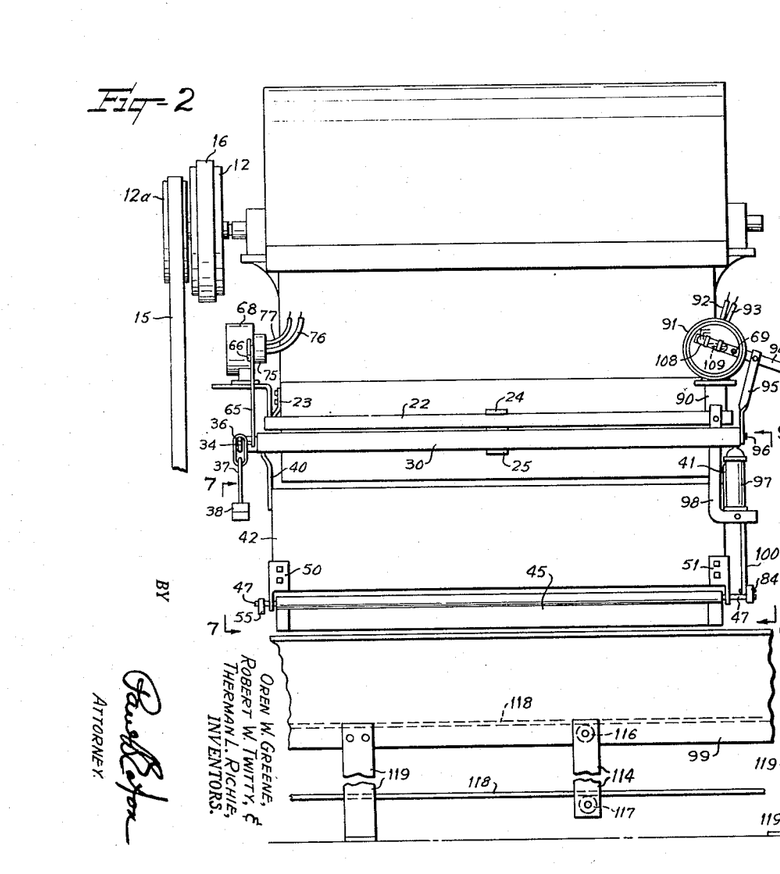
Figure 2 is an enlarged front elevation of one of the feeders and a portion of the conveyor as shown in Figure 1.
Figure 3:
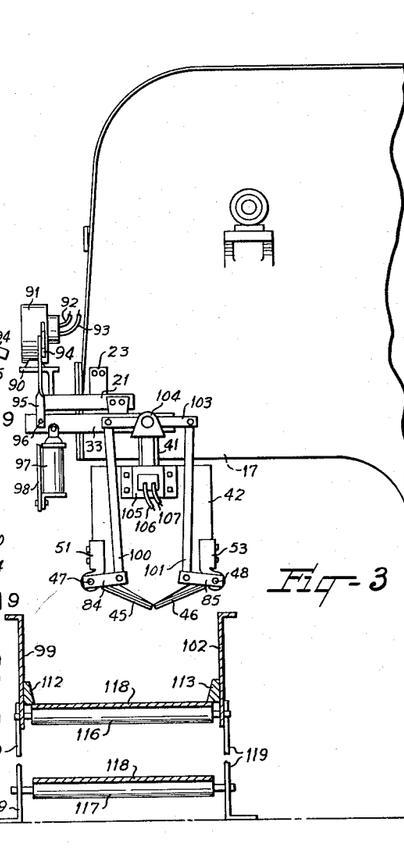
Figure 3 is an elevation looking at the right-hand end of Figure 2 with parts broken away and showing the conveyor in vertical cross-section.

This cross bar 103 is pivotally connected to a core 104 of a solenoid 105 having wires 106 and 107 leading therefrom and being connected to other parts of the electrical circuit to be later described. The solenoid 105 is suitably secured to the end of the container 42. The wires 106 and 107 are connected through intervening wires to a mercury switch bulb 108 (Figure 11) having liquid mercury 109 therein and which controls the opening of the closures 45 and 46 in the bottom of the container 42 in a manner to be later described. The mercury switch bulb 108 is disposed within a conventional housing 91 mounted on a bracket 90 on the U-shaped member 22 (Figure 2). This mercury switch housing 91 and its associated parts is identical to the mercury switch 67 previously described for the electric motor 10, except its ends are reversed on its lever 94 and during the time that the fibers are being fed into the container 42, the mercury switch bulb 108 in the housing 91 occupies the position shown in Figure 11.

The mercury switch bulb 108 is mounted on a lever 94 and has a link 95 connected thereto which is pivotally connected as at 96 to the leg 33 of the U-shaped member 30. Also mounted on the leg 33 is a conventional dash-pot 97 to which is connected a link 98 which is connected to the leg 21 of the member 22 which is fixedly secured to the discharge portion of the feeder. This dash-pot is a conventional mechanism and merely slows down the swinging movement of the member 30 and associated parts.

It will be noted that the above described mechanism refers to the normally de-energized solenoid circuit employed in the Patent Number 2,412,506. It will be noted that the bulb 108 in Figure 11 has contacts 110, and 111 therein which are normally out of contact with the mercury 109 disposed within the mercury tube or bulb 108 when the parts are in the position shown in Figure 9, for example. The contacts 110 and 111 are connected to wires 92 and 93, respectively, which extend from the housing 91 (Figure 11) and are connected at their other ends to the electrical circuit to be later described. As the fibers are deposited in the container 42 it will move downwardly very gradually until the predetermined amount of fibers have been deposited in the container 42. The container 42 will then have moved the lever 94 (Figure 2) upwardly sufficiently to cause the mercury 109 therein to contact the points 110 and 111 to be ready to energize the solenoid 105 and to forcibly open the closure members 45 and 46 to dump the contents from the container 42 inasmuch as the solenoid 105 will overcome the tension in the tension spring 61. However, it will be readily understood, upon the electrical circuit shown in Figure 16 being fully described, that the solenoid 105 will not be energized by the mercury 109 moving into engagement with the contacts 110 and 111 in Figure 11 until all of the containers in a series have been filled with the predetermined amount of fibers.

For example, the container 42 associated with feeder A might be set to move downwardly at 4 pounds, while container 42 of feeder B would be set to move downwardly at 6 pounds, and the container associated with feeder C would be set to move downwardly at 8 pounds. When this downward movement of the containers took place, the motor 10 for the particular feeder would be stopped when the predetermined amount of fibers will have been deposited in its receiving container, but the solenoid 105 associated with the discharging of the contents from the container, for allowing the opening of the bottom closure members 45 and 46, would not function for the reason that this will not take place until all of the containers have been charged to the predetermined amount of fibers to be placed therein according to weight.

Any suitable means may be provided for conveying the discharged fibers from the containers 42 to the hopper to be later described associated with another fiber treating apparatus. An elongated continuous conveyor is shown in the drawings as being provided for this purpose. This conveyor comprises an elongated trough having side walls 99 and 102 with slats 112 and 113 disposed near the bottom inner side portions thereof. The walls 99 and 102 are supported by legs 119. The side walls 99 and 102 have a plurality of brackets 114 and 115 in which upper rollers 116 are mounted and also lower rollers 117. The upper rollers 116 are designed to support the upper reach of the horizontal portion of an endless belt 118 and the lower rollers 117 are provided to support the lower reach of the horizontal portion of the belt 118.

Figure 1:
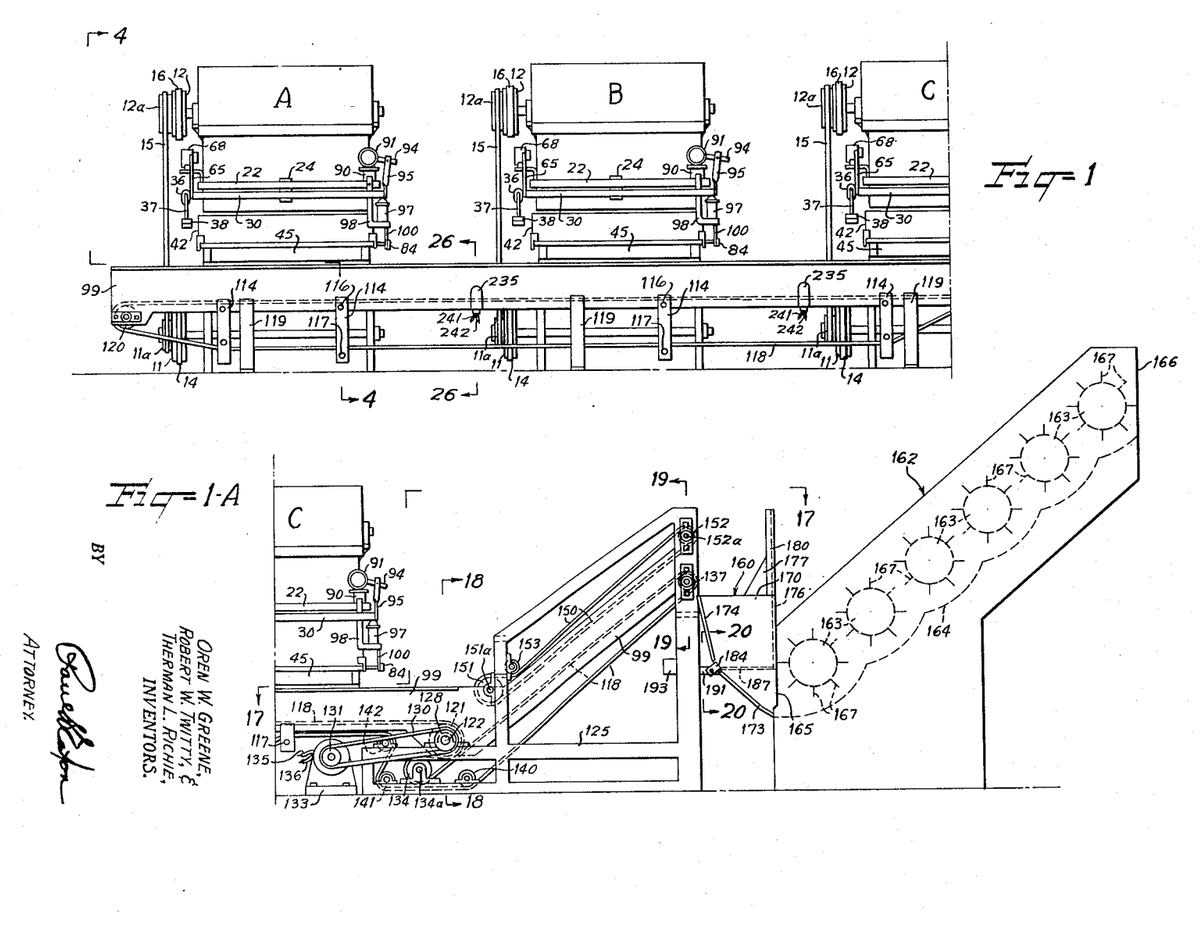
Figure 1 is a front elevation showing a plurality of feeders with a common conveyor for receiving the fibers processed by the feeders and the said conveyor having a portion of the invention applied thereto.
Figure 18:
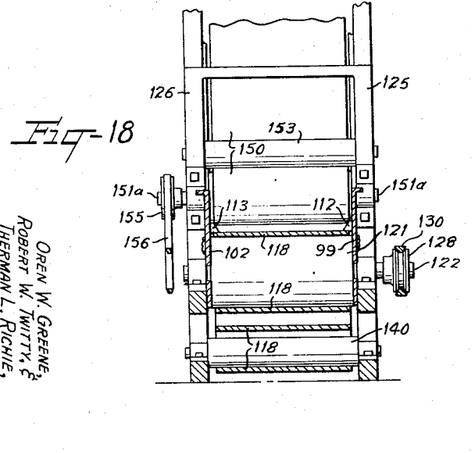
Figure 18 is an enlarged vertical sectional view being taken substantially along the line 18—18 in Figure 1–A and showing a portion of the horizontal and inclined portions of the conveyor.
Figure 19:
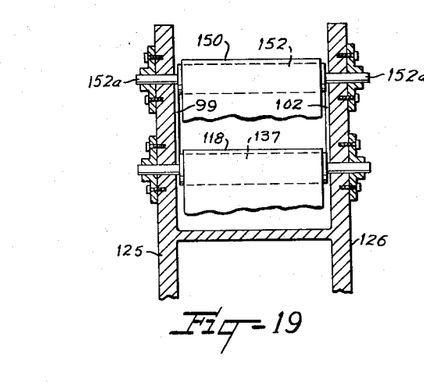
Figure 19 is an enlarged vertical sectional view taken substantially along the line 19—19 in Figure 1–A.

Referring to Figure 1, it may be observed that the left-hand portion of the endless belt 118 is mounted on a roller 120 and, as schematically shown in Figure 1-A, the right-hand portion of the horizontal upper reach of the belt 118 passes over a suitable roller 121 fixedly mounted on a shaft 122 which is rotatably mounted in suitable bearings fixedly mounted on side frame members 125 and 126 which generally support the inclined portion of the conveyor belt 118. A V-pulley 128 is fixedly mounted on one end of the shaft 122 (Figures 1-A and 18) and has a V-belt 130 mounted thereon which extends to a pulley 131 driven by a motor 133 having wires 135 and 136 extending therefrom to a suitable source of electrical energy, not shown.

The endless belt 118 then extends to the left in Figure 1-A and passes around an idler roller 134 fixed on a shaft 134a which is also rotatably mounted in suitable bearing blocks secured to the side frame members 125 and 126. The upper reach of the belt 118 then extends upwardly at an angle and passes closely adjacent the roller 121 and its upper portion passes around an idler roller 137 (Figures 1-A and 19) which is rotatably mounted in suitable bearing blocks secured to the side frame members 125 and 126. The lower reach of the belt 118 then extends downwardly at an angle substantially parallel to the upper reach thereof and then passes beneath idler rollers 140 and 141 and then upwardly and over another idler roller 142 (Figure 17) after which the lower horizontal reach of the belt 118 passes over the rollers 117, heretofore described, as shown in Figure 1.

Figure 17:
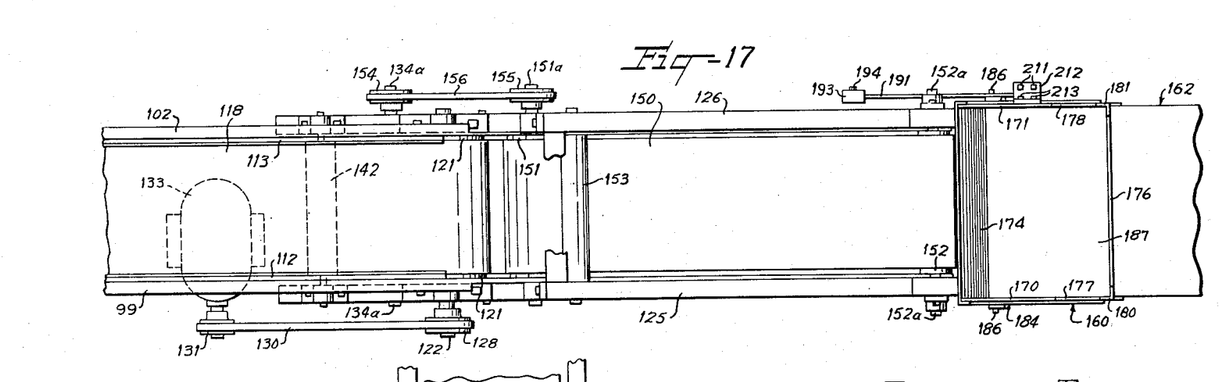
Figure 17 is an enlarged top plan view of the inclined portion of the conveyor and the hopper and is taken looking substantially along the line 17—17 in Figure 1–A.

The rollers 140, 141 and 142 (Figure 1-A) are rotatably mounted in suitable bearing blocks secured to the side frame members 125 and 126. It may be observed in Figures 1-A and 17 that the frame members 125 and 126 also support a suitable idler conveyor comprising a continuous belt 150, whose lower reach is disposed in parallel relation to the upper reach of the inclined portion of the conveyor belt 118. The purpose of the conveyor belt 150 is to prevent the fibers on the inclined portion of the conveyor belt 118 from rolling, by gravity, down the inclined portion of the conveyor belt as they are carried up the same, preparatory to being dumped into the hopper to be presently described.

The conveyor belt 150 is mounted at opposite end portions thereof on idler rollers 151 and 152 fixed on shafts 151a and 152a, respectively, which are rotatably mounted in suitable bearing blocks suitably secured to the side frame members 125 and 126. Another idler roller 153 is provided to insure that proper contact is made between the belt 150 and the rollers 151. This idler roller 153 engages the upper reach of the belt 150 and is rotatably mounted in suitable bearing blocks secured to the side frame members 125 and 126.

Referring to Figure 17 it may be observed that the shafts 134a and 151a have V-pulleys 154 and 155, respectively, fixedly mounted thereon and on which a V-belt 156 is mounted to thus drive the conveyor belt 150 at the same rate of speed as the conveyor belt 118.

After the batches of fibers from the various feeders A, B and C have moved up the inclined portion of the belt 118, it will be noted in Figure 1-A that the batches fall off the end of the conveyor into a funnel-like hopper broadly designated at 160. There are many types of fiber preparation machines, such as superior cleaners and blenders to which this hopper 160 may be connected, and in the drawings there is shown, schematically, a superior blender 162 which usually has a plurality of driven rotatable beaters 163 therein, there being a suitably formed transverse partition 164 extending in parallel relation to the row of beaters 163 to form a bottom for the housing within which the beaters 163 are disposed. This structure is shown in Suttenfield, Patent Number 2,102,442, of December 14, 1937. In Figure 1-A it may be observed that the type of blender shown has an intake opening 165 at its left-hand end and a discharge opening is indicated by the reference character 166 at its right-hand end.

The hopper 160 comprises irregularly cut polygonal side walls 170 and 171 which are adapted to be secured to the side walls of the blender 162 by any suitable means such as welding, spot welding, riveting or the like. A lower inclined panel 173 spans the distance between the side panels 170 and 171 and is bent around the remote edges of the panels 170 and 171 and is secured thereto by any suitable means such as spot welding.

The hopper 160 is also provided with an upper inclined panel 174 which is disposed at a more acute angle relative to the vertical than the lower panel 173 and this upper panel 174 also spans the distance between the vertical side wall members 170 and 171 and is flanged at opposite sides thereof; the flanges being spot welded to the side wall members 170 and 171.

Figure 20:
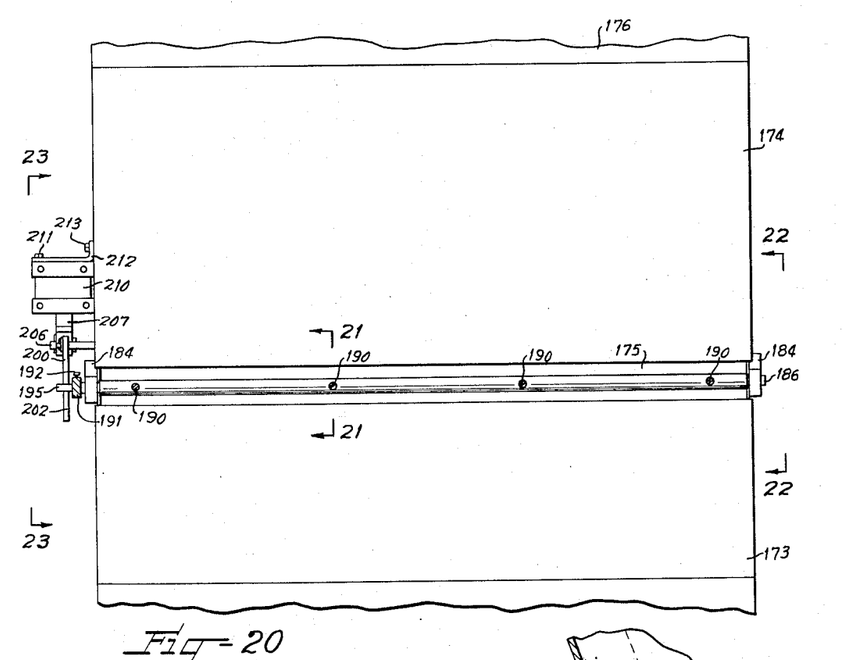
Figure 20 is an enlarged elevation with parts in section and is taken along the line 20—20 in Figure 1–A and showing a portion of the improved hopper.

It will be noted that the lower edge of the panel 174 is spaced apart from the upper edge of the lower panel 173, thus forming an elongated opening 175 (Figure 20). Disposed at the opposite side of the hopper 160 from the panel 174 is a vertically disposed panel 176 (Figure 1-A), the lower end of which terminates a substantial distance above the juncture of the lower panel 173 with the blender 162 and the upper portion of which extends a substantial distance above the upper open end of the hopper 160, to thus serve as a baffle to prevent the fibers from being dumped off the end of the conveyor beyond the hopper 160 and to provide an opening in the hopper for discharging its contents through the coinciding opening 165 into the blender 162.

The panel 176 is welded at opposite side edges thereof to the vertical side panels 170 and 171. The upper portion of the panel 176 is reinforced by angle members 180 and 181 being welded to the remote edges of the upper portion of panel 176 and being welded at their lower ends to the upper edges of the panels 170 and 171. Gusset plates 177 and 178 (Figures 1-A and 17) are welded to upper edges of sidewalls 170 and 171 and to angle members 180 and 181 to lend further rigidity to the panel 176.

Figure 21:
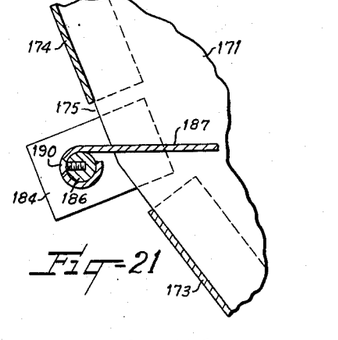
Figure 21 is an enlarged vertical sectional view being taken along the line 21—21 in Figure 20.
Figure 22:
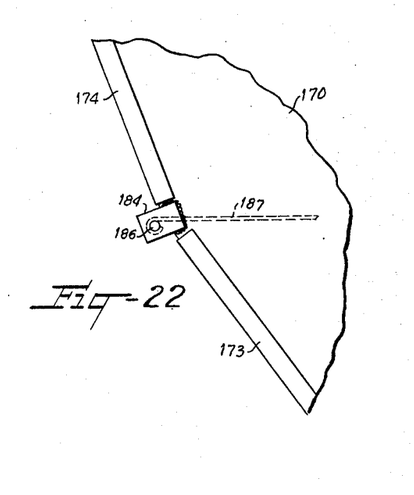
Figure 22 is an elevation showing a portion of the right-hand end of the hopper in Figure 20 and showing the manner in which the pivoted bottom of the hopper is mounted.

Welded to the remote surfaces of the side wall panels 170 and 171 are bearing blocks 184 (Figure 20) in which opposite ends of a pivot shaft 186 are oscillatably mounted. Loosely mounted between the side wall members 170 and 171, for vertical swinging movement within the hopper 160, is a pivoted bottom panel 187 whose left-hand end in Figures 21 and 22 is curved around and conforms to the pivot shaft 186. This panel 187 is secured to the shaft 186 by screws 190 (Figures 20 and 21).

Figures 23, 24:
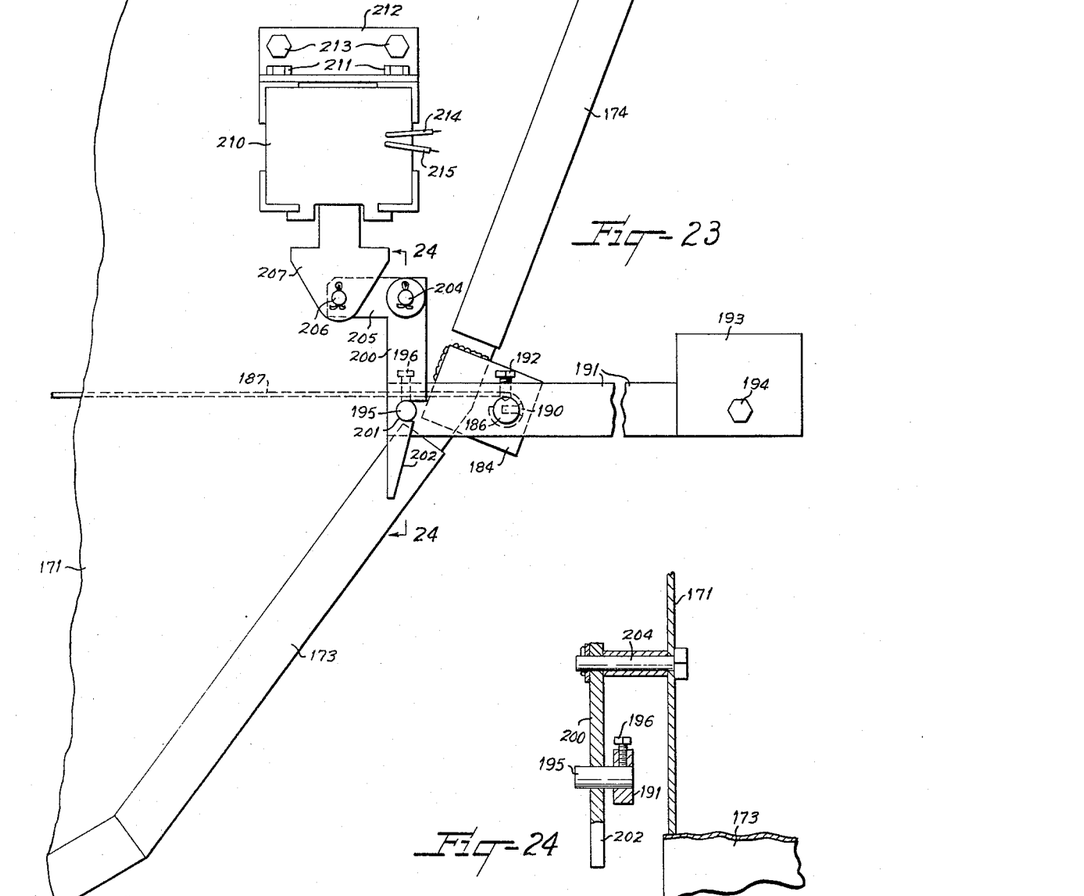
Figure 23 is an enlarged elevation showing a portion of the left-hand end of the hopper shown in Figure 20 and is taken looking along the line 23—23 in Figure 20 and showing the solenoid for controlling the locking and releasing of the pivoted bottom of the hopper.
Figure 24 is a vertical sectional view being taken substantially along the line 24—24 in Figure 23.

The left-hand portion of the shaft 186 in Figure 20 slidably penetrates and extends beyond the bearing block 184 and has a weight arm 191 fixedly mounted thereon as by a set screw 192 (Figure 23). This weight arm 191 may be of any desired length and has a weight member 193 adjustably secured thereon as by a set screw 194. It may be observed in Figures 23 and 24 that the weight arm 191 extends a substantial distance to the left from the pivot shaft 186 and has a pin 195 secured therein as by a set screw 196 and projecting outwardly therefrom. When the panel 187 is in a horizontal or closed position as shown in Figure 20, the pin is adapted to engage a bell crank 200 having a notch 201 therein which is adapted to slidably receive the pin 195. The lower end portion of the bell crank 200 is provided with a tapered cam surface 202, the purpose of which will be later described.

The bell crank 200 is oscillatably mounted as at 204 on the side wall member 171 and has a horizontal link portion 205 whose left-hand end in Figure 23 is pivotally connected as at 206 to the lower end of a solenoid core rod 207. The solenoid core rod 207 extends upwardly and is mounted for vertical sliding movement within a conventional solenoid 210 secured as by screws 211 to an angle clip 212. The angle clip 212 is secured to the side panel 171 as by screws 213. The solenoid coil 210 has electric wires 214 and 215 extending therefrom which are connected to the electrical circuit to be later described.

The solenoid 210 is responsive to the dumping of the contents from the containers 42 of the feeders A, B and C as will readily be understood upon following the description of the wiring diagram shown in Figure 16 and which will be later described. At the time that the contents from the containers 42 are dumped onto the upper reach of the conveyor belt 118, the solenoid 210 will be energized to thus cause the solenoid core rod 207 to move upwardly within the solenoid 210 which will result in the bell crank 200 moving in a clockwise direction in Figure 23.

It is manifest that upon the initial starting of the conveyor 118, there would be no fibers in the hopper 160 resting on the pivoted bottom 187, and, consequently, as the bell crank 200 is moved in a clockwise direction, the weight 193 at the end of the weight arm 191 in Figure 23 will be sufficient to hold the pivoted bottom plate 187 in elevated or horizontal position. However, assuming that a batch of fibers from each of the three machines A, B and C had previously been dumped into the hopper 160, then, upon the contents from the containers 42 again dumping onto the conveyor to again energize the solenoid, the weight of the fibers on the pivoted bottom plate 187 would more than overcome the weight of the weight member 193 and would thus cause the pivoted bottom 187, along with the weight arm 191, to move in a counterclockwise direction in Figure 23, to thus dump the contents of the hopper 160 into the lower portion of the hopper and thus through the opening 165 into the blender 162. It is thus seen that the fibers from all of the machines A, B and C will enter the feed end of the blender 162 simultaneously to thus insure a more uniform blending of the fibers than has heretofore been possible.

Now, immediately upon the fibers in the hopper 160 sliding off the free end of the pivoted bottom plate 187, the weight member 193 will cause the weight arm 191 and the plate 187 to move in a clockwise direction in Figure 23. The circuit to the solenoid 210 will have been broken and the core rod 207 will have moved downwardly, by gravity. Since the core rod 207 is loosely mounted in the solenoid 210, the pin 201 on the weight arm 191 will engage the cam surface 202 of the bell crank 200, thus moving the bell crank in a clockwise direction in Figure 23 until the pin 195 is again in engagement with the notch 201 in the bell crank 200 to thereby hold the plate 187 in locked position until the solenoid is again energized as will be later described. The drums 163 of the blender 162 have teeth 167 which engage the fibers from the hopper 160 to withdraw the fibers therefrom and to convey the same through the blender.

*Electrical circuit*

Figure 16:
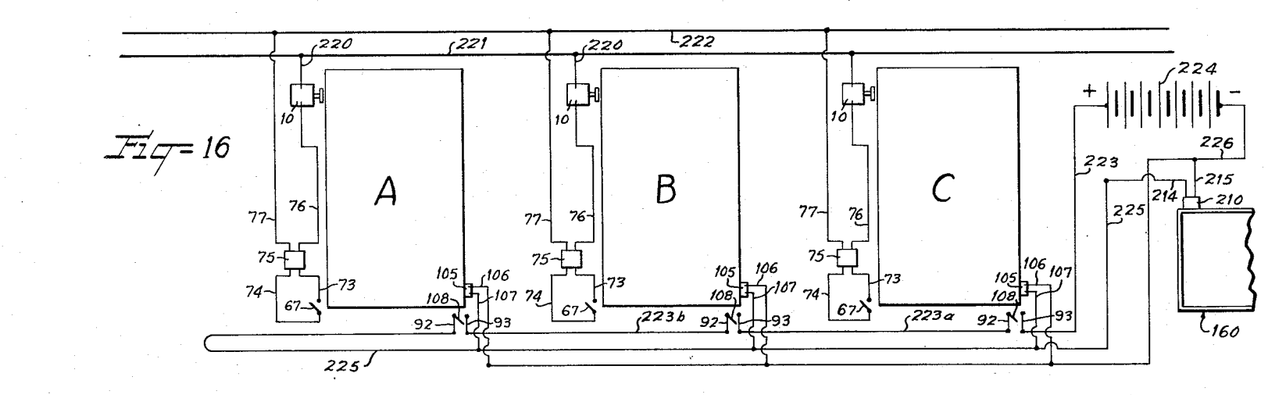
Figure 16 is a schematic wiring diagram of the apparatus when the solenoid for actuating the bottom closure members of the fibre receiving containers are normally de-energized and also showing the electrical connections for controlling the hopper to which the batches of fibres are directed from the feeders.

Referring to Figure 16, there is shown the arrangement of the electrical circuit for controlling the operation of the feeders A, B and C in cooperation with each other and showing the electrical connections to the hopper 160 so the solenoid 210 associated with the hopper 160 may respond to the dumping of the containers 42 associated with the feeders A, B and C. It may also be observed that the switch 67 controls the electric motor 10 for each of the feeders A, B and C and it has already been stated how the electric wires 73 and 74 extend from the switch 67 through a box 75 and are connected to wires 76 and 77 which extend from the other side of the box 75.

The wire 76 is connected to one side of the electric motor 10 and there is a wire 220 extending from the other side of the electric motor and the wires 220 from all of the feeders A, B and C are connected to a common lead wire 221. The electric wires 77 from all of the feeders A, B and C are connected to another common lead wire 222 to thus complete an electrical circuit to all of the motors 10 when the corresponding switches 67 are closed.

During the time that the feeders A, B and C are filling their associated fiber containers 42, the switches 67 are normally in a closed position and the switches 108 are normally in an opened position, as shown in Figures 12 and 11, respectively.

Referring again to Figure 16, it may be observed that the wire 93 associated with the feeder C, at the right-hand end of Figure 16, is connected to a wire 223 which extends from a suitable source of electrical energy such as the plus side of a storage battery 224 and this wire 93, of course, extends to the switch 108. The wire 92 extends from the other side of the switch 108 and is connected to a wire 223a which extends to the feeder B and is connected to its associated wire 93, while the wire 92 at the other side of the switch 108 associated with the feeder B is connected to a wire 223b which is connected at its other end to the wire 93 associated with the feeder A. The wire 92 at the other side of the switch 108 of feeder A is connected to a wire 225 which is connected to the wire 214 at one side of the solenoid 210 associated with the hopper 160.

The wire 215 at the other side of the solenoid 210 is connected to a common lead wire 226 which extends from the minus side of the storage battery 224 and also has the wires 106 from the solenoids 150 associated with the feeders A, B, and C connected thereto. It will be noted that the wires 107 from the other side of the solenoids 105 are connected to the wire 225 which extends from the wire associated with the feeder A to the wire 214 of the solenoid coil 210 as heretofore described.

Now, let us assume that the containers 42 associated with one or both of the feeders A and B have moved downwardly to close the switches 108 in the manner heretofore described. Still no current can pass to the coils 105 associated with the machines A and B until the last machine, which, let us say, will be machine C has filled its container to the predetermined poundage and cause it to move downwardly. This will close the switch 108 on the machine C and thus establish a circuit through all of the switches 108 to energize all of the solenoids 105 to forcibly push the doors or closures 45 and 46 downwardly, thus opening the containers 42 to discharge the contents therefrom.

Now, upon the circuit being completed by the closing of all of the switches 108, it is manifest that the circuit will also be completed to the solenoid 210 associated with the hopper 160, thus causing the pivoted bottom plate 187 to move downwardly at its free end and dumping the contents from the hopper into the blender or the like, in the manner heretofore described. It has already been stated how the switches 67 will be de-energized immediately upon the predetermined poundage being reached in each of the containers 42, and which will automatically de-energize the motors 10.

The containers 42, being relieved of their weight, will then move upwardly to their normal position which will again open all of the switches 108 to de-energize the solenoids 105 and then the tension spring 61 will close all of the bottom closures 45 and 46 associated with the machines A, B and C. This return of the containers 42 to their normal position will also close all of the switches 67 in the motor circuit and start all of the machines in another cycle of operation.

It is thus seen that by the use of machines of the type described and the improved hopper 160 and with a circuit such as that shown in Figure 16, the batches of fibers from the machines A, B and C, although they are dumped onto the conveyor belt 118 simultaneously, may be delivered to the blender or the like in superposed relation to each other and also simultaneously, to thus produce a more uniform blend of the fibers upon the fibers being discharged from the other end of the blending machine 162 (Figure 1-A).

The foregoing specification emphasizes certain inherent outstanding features of the present invention. The fibers may be weighed with a high degree of accuracy and in amounts of as little as a few ounces because of the simplicity of the several machines, particularly as regards the scale mechanism. The weight lever or scale beam 34 is pivoted by the weight of the fibers when the amount thereof received in the container 42 is equivalent to the predetermined weight; and this movement is not appreciably impeded by the actuation of the mercury switches which are actuated by the scale beam.

Moreover, maintenance of the predetermined percentages of the several different fibers during prolonged operation of the apparatus is insured by the provision of apparatus which prevents the discharge of fibers from any of the fiber-receiving containers in the event that less than the predetermined amount of fiber is weighed in any of those containers.

In the drawings and specification there has been set forth a preferred embodiment of the invention, and although specific terms are employed, they are used in a generic and descriptive sense only, and not for purposes of limitation, the scope of the invention being defined in the claims.

We claim:

1. Apparatus for use in blending fibers comprising a plurality of machines for concurrently feeding, weighing and discharging predetermined amounts of each of a plurality of different fibers in successive batches, each machine including a scale beam and a receptacle having a bottom door operatively associated with said scale beam, a hopper having a door in its lower portion, conveyor means positioned to receive batches of fibers discharged from the several receptacles and to deliver said batches into said hopper in superposed layers constituting a sandwich, an upwardly inclined fiber mixer disposed to receive in its lower portion a sandwich of fibers discharged from said hopper and including beaters to move the fibers upwardly to an outlet near its upper end while mixing and blending them, and automatic means to insure maintenance of the predetermined percentages and uniformity of mixing of the several different fibers in successive batches, said means including an electircal circuit having switch means arranged in series and associated respectively with said machines, each switch being automatically closed by the scale beam of its machine concurrently with the receipt of the predetermined amount of fibers in the receptacle of said machine, said circuit also including solenoids arranged in parallel and operatively associated respectively with the doors of the hopper and of each of the machines to open said doors, the closing of all of said switches causing simultaneous energization of said solenoids.

2. Apparatus for use in blending fibers comprising a plurality of machines for concurrently feeding, weighing and discharging predetermined amounts of each of a plurality of different fibers in successive batches, each machine including a scale beam and a receptacle having a bottom door operatively associated with said scale beam, a hopper having a door in its lower portion, conveyor means positioned to receive batches of fibers discharged from the several receptacles and to deliver said batches into said hopper in superposed layers, an upwardly inclined fiber mixer disposed to receive in its lower portion fibers discharged from said hopper and including beaters to move the fibers upwardly to an outlet near its upper end while mixing and blending them, and automatic means to insure maintenance of the predetermined percentages and uniformity of mixing of the several different fibers in successive batches, said means including an electrical circuit having switch means associated with each machine and automatically closed by the scale beam of its machine concurrently with the receipt of the predetermined amount of fibers in the receptacle of said machine, said circuit also including electrical means operatively associated with the doors of the hopper and each of the machines to open said doors, the closing of all said switch means causing simultaneous energization of said electrical means.

References Cited in the file of this patent

UNITED STATES PATENTS

| Number | Name | Date |
| --- | --- | --- |
| 880,400 | Pryce | Feb. 25, 1908 |
| 2,057,641 | Curley et al. | Oct. 13, 1936 |
| 2,127,120 | Johnson et al. | Aug. 16, 1938 |
| 2,240,350 | Ross | Apr. 29, 1041 |
| 2,412,506 | Greene et al. | Dec. 10, 1946 |

FOREIGN PATENTS

| 120,676 | Great Britain | Oct. 21, 1918 |